United States Patent
Zhang et al.

(10) Patent No.: US 12,355,349 B2
(45) Date of Patent: Jul. 8, 2025

(54) THREE-LEVEL DC-DC CONVERTER AND CONTROL CIRCUIT THEREOF

(71) Applicant: Silergy Semiconductor Technology (Hangzhou) LTD, Hangzhou (CN)

(72) Inventors: Shuai Zhang, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 254 days.

(21) Appl. No.: 18/107,585

(22) Filed: Feb. 9, 2023

(65) Prior Publication Data

US 2023/0268831 A1    Aug. 24, 2023

(30) Foreign Application Priority Data

Feb. 22, 2022    (CN) .......................... 202210161731.9

(51) Int. Cl.
  *H02M 3/156*    (2006.01)
  *H02M 1/00*     (2006.01)
  *H02M 1/084*    (2006.01)

(52) U.S. Cl.
  CPC ......... *H02M 3/156* (2013.01); *H02M 1/0025* (2021.05); *H02M 1/0095* (2021.05); *H02M 1/084* (2013.01)

(58) Field of Classification Search
  CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24;
  (Continued)

(56) References Cited

U.S. PATENT DOCUMENTS 8,581,518 B2    11/2013   Kuang et al.
9,160,232 B2 *  10/2015   Thomas .............. H02M 3/1588
(Continued)

FOREIGN PATENT DOCUMENTS

CN    107346940 A    11/2017
CN    108566092 B     9/2018
(Continued)

OTHER PUBLICATIONS

Song et al., "A Soft-Switching High-Voltage Active Power Filter with Flying Capacitors for Urban Maglev System Applications", pp. 1461-1468 (Year: 2001).*

*Primary Examiner* — Jeffrey A Gblende

(57) ABSTRACT

A control circuit of a three-level DC-DC converter, can include where: the three-level DC-DC converter includes first, second, third, and fourth power switches coupled in series between an input voltage and a reference ground, and a flying capacitor coupled between a common node of the first and second power switches and a common node of the third and fourth power switches; and the control circuit is configured to adjust a phase difference between driving signals of the first and second power switches, and duty ratios of the first and second power switches, according to an error between a voltage across the flying capacitor and a predetermined value, such that the voltage across the flying capacitor is stabilized at the predetermined value.

19 Claims, 7 Drawing Sheets

(58) Field of Classification Search
CPC .......... G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H02M 3/07; H02M 3/073; H02M 7/10; H02M 7/103; H02M 7/106; H02M 2003/071; H02M 2003/072; H02M 2003/075; H02M 2003/076; H02M 2003/077; H02M 2003/078; H02M 2001/007; H02M 2001/0048; H05B 39/048; B23K 11/24; H04B 2215/069; F25B 49/00; F25B 49/005; F25B 2700/15; F25B 2700/00

See application file for complete search history.

(56) References Cited

U.S. PATENT DOCUMENTS

| | | | | |
|---|---|---|---|---|
| 11,088,631 | B2* | 8/2021 | Zhang | H02M 7/487 |
| 12,143,008 | B2* | 11/2024 | Lee | H02M 3/07 |
| 2011/0127925 | A1 | 6/2011 | Huang et al. | |
| 2017/0318639 | A1 | 11/2017 | Wang et al. | |
| 2018/0295685 | A1 | 10/2018 | Wang et al. | |
| 2018/0295690 | A1 | 10/2018 | Chen et al. | |
| 2018/0310376 | A1 | 10/2018 | Huang et al. | |
| 2020/0366255 | A1* | 11/2020 | Hoyerby | H02M 1/0077 |
| 2021/0359606 | A1 | 12/2021 | Han et al. | |
| 2022/0029540 | A1 | 1/2022 | Zhang et al. | |

FOREIGN PATENT DOCUMENTS

| | | |
|---|---|---|
| CN | 112019052 A | 12/2020 |
| CN | 1112821757 A | 5/2021 |

* cited by examiner

THREE-LEVEL DC-DC CONVERTER AND CONTROL CIRCUIT THEREOF

RELATED APPLICATIONS

This application claims the benefit of Chinese Patent Application No. 202210161731.9, filed on Feb. 22, 2022, which is incorporated herein by reference in its entirety.

FIELD OF THE INVENTION

The present invention generally relates to the field of power electronics, and more particularly to power converters and associated control circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
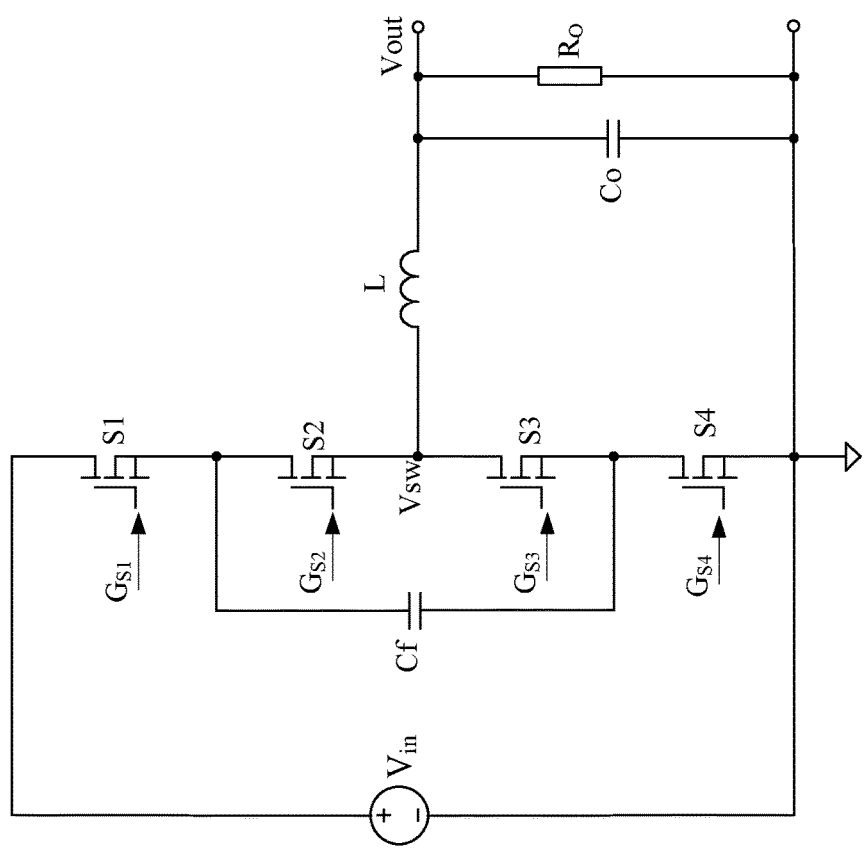
FIG. 1 is a schematic circuit diagram of an example three-level DC-DC converter.

Referring now to FIG. 1, shown is a schematic circuit diagram of an example three-level DC-DC converter. In this particular example, the three-level DC-DC converter is a three-level Buck converter, which can include power switches S1-S4, flying capacitor Cf, inductor L, and output capacitor Co. Driving signals $G_{S1}$ and $G_{S4}$ of power switches S1 and S4 are complementary, and driving signals $G_{S2}$ and $G_{S3}$ of power switches S2 and S3 are complementary. Further, the duty ratios of driving signals $G_{S1}$ and $G_{S2}$ of power switches S1 and S2 are equal, and phase difference α of driving signals $G_{S1}$ and $G_{S2}$ of the power switches S1 and S2 is 180° (i.e., π radians). However, due to the parasitic parameters and errors of various devices in the circuit, the voltage of flying capacitor Cf may be unbalanced, such as greater than ½Vin or less than ½Vin, which can cause the current of inductor L to be unstable, thus reducing the reliability of the whole circuit.

In some approaches, there are many control methods to solve the problem of voltage imbalance of the flying capacitor. According to the difference between the voltage of the flying capacitor and ½Vin, phase difference α of driving signals $G_{S1}$ and $G_{S2}$ of power switches S1 and S2 is adjusted. Assuming that the phase difference α is equal to π (i.e., α=π1), and duty ratio D1 of driving signal $G_{S1}$ is equal to duty ratio D2 of driving signal $G_{S2}$ (i.e., D1=D2=D) in the original state, if voltage $V_{Cf}$ of flying capacitor Cf is less than ½Vin, phase difference α can be increased, such that charge amount $Q_c$ of the flying capacitor increased during the charging phase is larger than charge amount $Q_d$ of the flying capacitor decreased during the discharging phase; that is, the charge amount is increased by ΔQ. Similarly, if voltage Vcf of the flying capacitor is greater than ½ Vin, phase difference α can be reduced, so that charge amount $Q_c$ of the flying capacitor increased during the charging phase is less than charge amount $Q_d$ of the flying capacitor decreased during the discharging phase; that is, the charge amount is decreased by ΔQ. However, the approach of balancing the voltage of the flying capacitor only by phase-shifting control may have weak voltage-sharing ability when the duty ratio is close to 0 or 1 in the CCM mode, and the phase-shifting control may have no voltage-sharing ability when duty ratio D is less than 0.5 in the DCM mode, so this approach may not carry out voltage-sharing.

Figure 2:
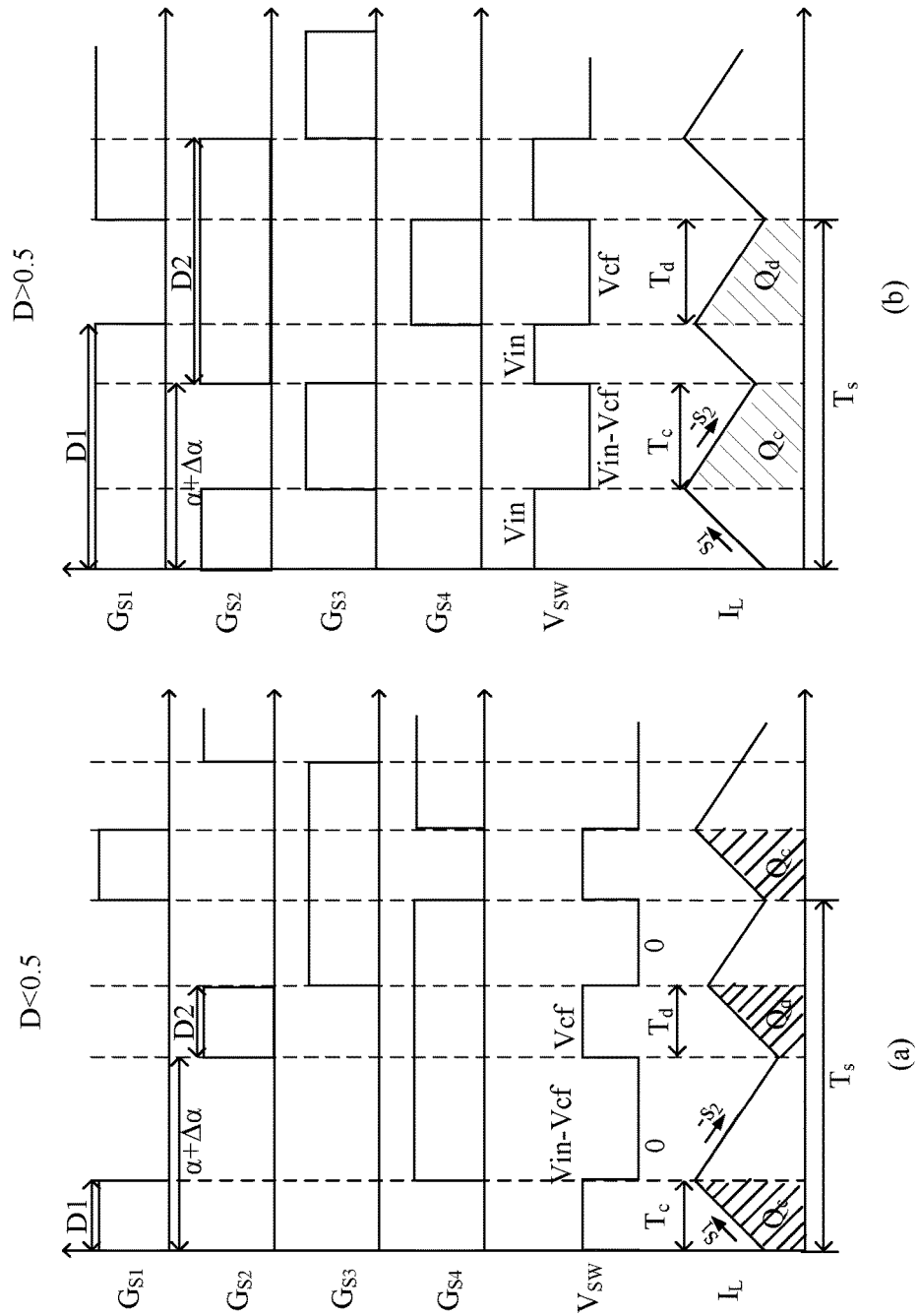
FIG. 2 is a waveform diagram of an example operation of a three-level DC-DC converter in a CCM mode.
Figure 3:
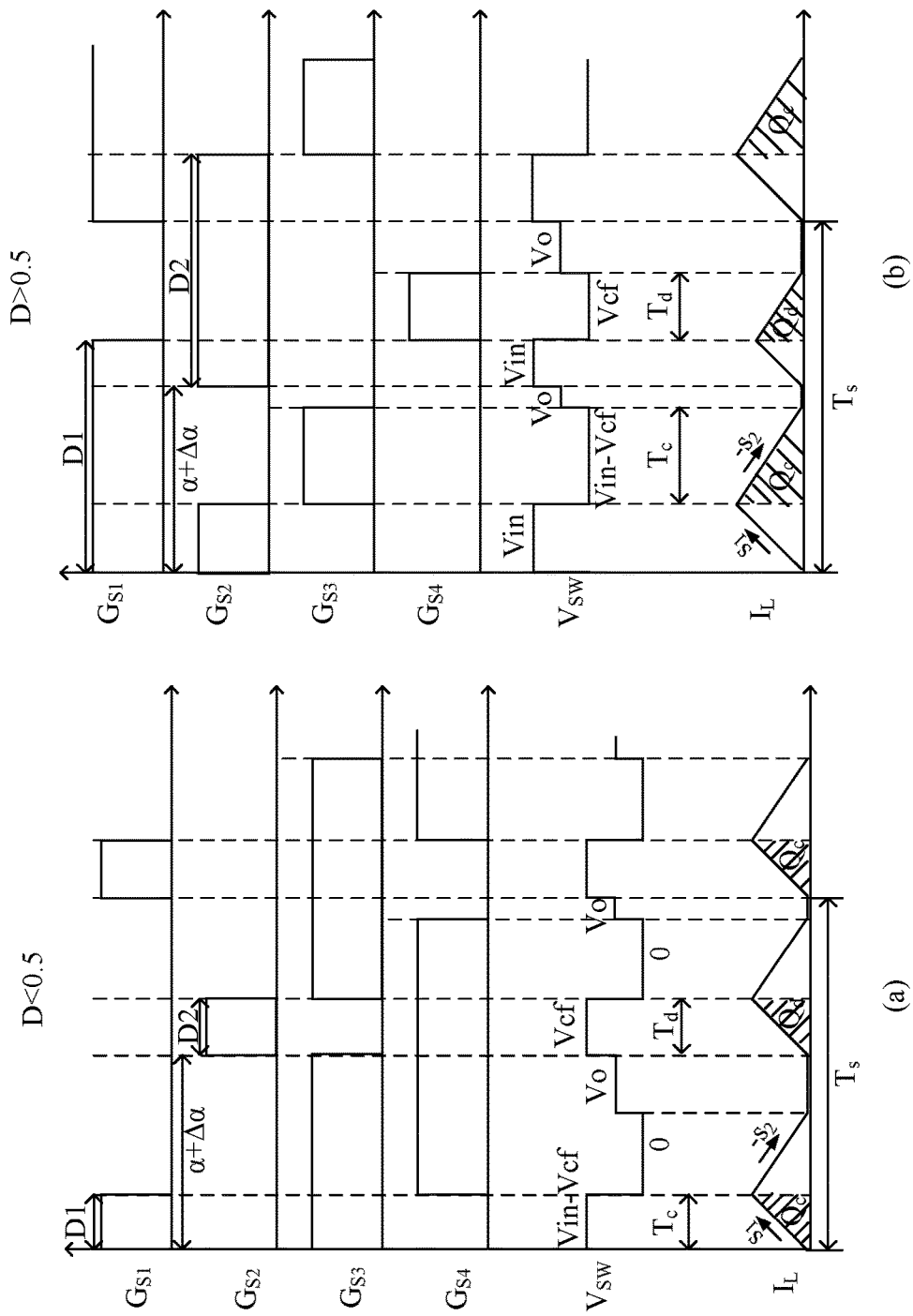
FIG. 3 is a waveform diagram of an example operation of a three-level DC-DC converter in a DCM mode.

Referring now to FIG. 2, shown is a waveform diagram of an example operation of a three-level DC-DC converter in a CCM mode. Referring also to FIG. 3, shown is a waveform diagram of an example operation of a three-level DC-DC converter in a DCM mode. Taking the three-level buck converter shown in FIG. 1 as an example, the three-level buck converter comprises: first to fourth power switches (e.g., S1-S4) connected in series between an input voltage and a reference ground; flying capacitor Cf connected between the common node of the first and second power switches (e.g., S1 and S2) and the common node of the third and fourth power switches (e.g., S3 and S4); and a control circuit configured to adjust a phase difference between driving signals of the first and second power switches and duty ratios of the driving signals according to an error between a voltage across the flying capacitor and a predetermined value, such that the voltage across the flying capacitor is stabilized at the predetermined value. The three-level buck converter can also include an inductor connected between the common node of the second and third power switches (e.g., S2 and S3) and the output terminal.

Voltage Vcf of the flying capacitor is balanced by only adjusting phase difference α of driving signals $G_{S1}$ and $G_{S2}$ of power switches S1 and S2, and it can be obtained as below in formula (1):

$$s_1 = \begin{cases} (V_{in} - V_{cf} - V_o)/L_o, & D < 0.5 \\ (V_{in} - V_o)/L_o, & D > 0.5 \end{cases} \quad (1)$$

$$s_2 = \begin{cases} V_o/L_o, & D < 0.5 \\ (V_o - V_{cf})/L_o, & D > 0.5 \end{cases}$$

Here, $s_1$ and $s_2$ represent the rising and falling slopes of inductor current $I_L$, respectively. When the three-level DC-DC converter operates in the CCM mode, assuming that the variation of phase difference α is Δα, charge variation ΔQ of the flying capacitor at this time is shown in formula (2), where $T_s$ is the switching cycle. When duty ratio D is less than 0.5 (i.e., D<0.5), charge variation ΔQ is proportional to D and Δα, and when duty ratio D is greater than 0.5, (i.e., D>0.5), charge variation ΔQ is proportional to (1−D) and Δα, so when duty ratio D approaches 0 and 1, charge variation ΔQ approaches 0. Therefore, when the duty ratio is close to 0 or 1, the voltage-sharing ability of phase shift control may be relatively weak.

$$\Delta Q = \begin{cases} s_2 D T_s \Delta \alpha T_s/2\pi, & D < 0.5 \\ s_1(1-D)T_s \Delta \alpha T_s/2\pi, & D > 0.5 \end{cases} \quad (2)$$

When the three-level DC-DC converter operates in the DCM mode, assuming that the variation of phase difference α is Δα, charge variation ΔQ of the flying capacitor at this time is shown in formula (3). When duty ratio D is less than 0.5, (i.e., D<0.5), charge variation ΔQ is equal to 0, so there is no voltage-sharing ability under the phase-shifting control, so the voltage-sharing may not be performed.

$$\Delta Q = \begin{cases} 0, & D < 0.5 \\ 2 \cdot (s_1/s_2) \cdot s_1 \cdot (D - 0.5)T_s \Delta \alpha T_s/2\pi, & D > 0.5 \end{cases} \quad (3)$$

In summary, only by adjusting the phase difference to balance the voltage of the flying capacitor, the voltage-sharing ability can be weak when the duty ratio is close to 0 or 1 in the CCM mode, and the voltage-sharing may not be carried out when the duty ratio is less than 0.5 in the DCM mode. Thus, it may not be guaranteed that the voltage of the flying capacitor can be maintained at a predetermined value in the whole load range.

In particular embodiments, a voltage-sharing control method of the flying capacitor of the three-level DC-DC converter can include adjusting the phase difference between the first and second power switches of the three-level DC-DC converter according to the error between the voltage of the flying capacitor and the predetermined value, and simultaneously adjusting the duty ratio according to the variation of the phase difference, such that the voltage of the flying capacitor can be stabilized in a predetermined range under any load.

For example, when voltage $V_{cf}$ of flying capacitor Cf is greater than ½ $V_{in}$ (i.e., $V_{cf}$>½$V_{in}$), phase difference α decreases by Δα, duty ratio D1 of power switch S1 decreases by ΔD, and duty ratio D2 of power switch S2 increases by ΔD; and when voltage $V_{cf}$ of flying capacitor Cf is less than ½ $V_{in}$ (i.e., $V_{cf}$<½Vin), phase difference α increases by Δα, duty ratio D1 of power switch S1 increases by ΔD, and duty ratio D2 of power switch S2 decreases by ΔD. In addition, the variation trend of ΔD can be the same as that of Δα; that is, ΔD increases with the increase of Δα and decreases with the decrease of Δα. It should be understood that both ΔD and Δα mentioned here refer to the absolute value of the variation. For example, ΔD is proportional to Δα. Preferably, ΔD=kΔα/(2π), and k>0. The principle that the above-mentioned control strategy of particular embodiments can effectively balance the voltage of the flying capacitor in the whole load range will be explained in detail below.

Figure 4:
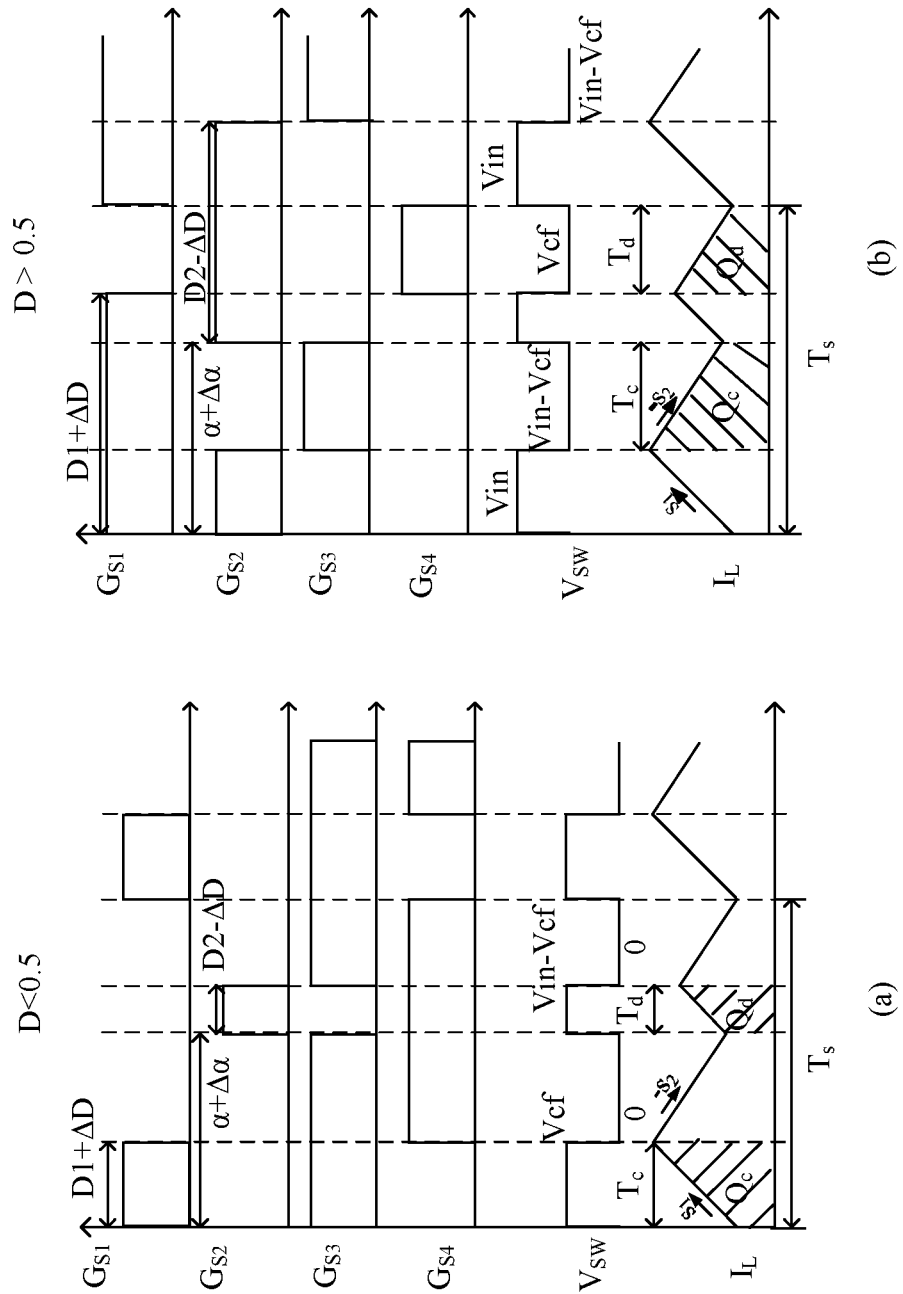
FIG. 4 is a waveform diagram of an example operation of a three-level DC-DC converter in a CCM mode, in accordance with embodiments of the present invention.
Figure 5:
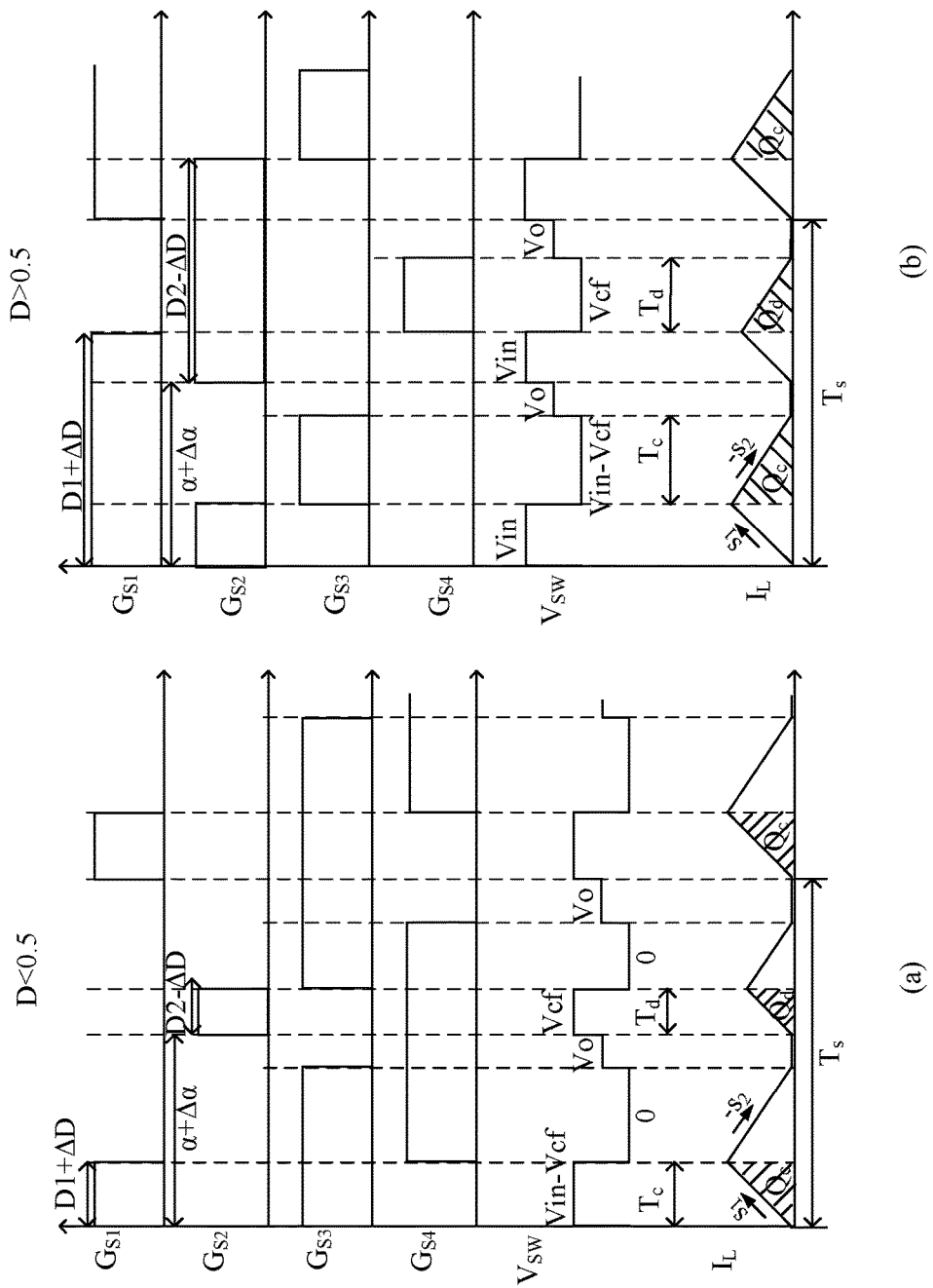
FIG. 5 is a waveform diagram of an example operation of a three-level DC-DC converter in a DCM mode, in accordance with embodiments of the present invention.

If the phase difference α is equal to π (i.e., α=π), duty ratio D1 is equal to duty ratio D2 (i.e., D1=D2=D), and charging charge amount $Q_c$ of the flying capacitor can be equal to discharging charge amount $Q_d$ of the flying capacitor in the initial state. If voltage $V_{cf}$ of the flying capacitor is less than ½$V_{in}$ (i.e., $V_{cf}$<½Vin), phase difference α increases by Δα, duty ratio D1 of power switch S1 increases by ΔD, and duty ratio D2 of power switch S2 may decrease by ΔD, and ΔD=k1Δα (where k1=k/(2π)), as shown in FIGS. 4 and 5. In both cases of D<0.5 and D>0.5, the freewheeling time of the inductor current before charging period $T_c$ can decrease due to the increase of the phase difference, such that the value of inductor current $I_L$ becomes larger at the starting point of charging period $T_c$, inductor current $I_L$ may increase during charging period $T_c$, and charging period $T_c$ can become longer due to the increase of duty ratio D1, so charging charge amount $Q_c$ can increase.

In addition, the freewheeling time of inductor current $I_L$ before discharge period $T_d$ can increase due to the increase of the phase difference, such that the value of inductor current $I_L$ becomes smaller at the starting point of discharge period $T_d$, inductor current $I_L$ decreases during discharge period $T_d$. Also, discharge period $T_d$ can decrease due to the decrease of duty ratio D2, so discharging charge amount $Q_d$ may decrease, and thus the charge amount increases by ΔQ, and voltage $V_{cf}$ across flying capacitor Cf can decrease. Similarly, if voltage $V_{cf}$ of the flying capacitor is greater than ½$V_{in}$ (i.e., $V_{cf}$>½Vin), phase difference α decreases by Δα, duty ratio D1 decreases by ΔD, duty ratio D2 increases by ΔD, and ΔD=k1Δα, such that the charge amount decreases by ΔQ, and voltage $V_{cf}$ across flying capacitor Cf can decrease. Therefore, this control strategy can effectively balance the flying capacitor voltage. For example, in the CCM mode, charge variation ΔQ can be deduced from FIG. 4, as shown in formula (4):

$$\Delta Q = \begin{cases} \Delta D T_s \cdot 2I_o + s_2 D T_s (\Delta\alpha/2\pi - \Delta D)T_s, & D < 0.5 \\ \Delta D T_s \cdot 2I_o + s_1(1-D)T_s (\Delta\alpha/2\pi - \Delta D)T_s, & D > 0.5 \end{cases} \quad (4)$$

Because formula (4) needs to satisfy that ΔQ is greater than 0, that is, in the full load range, the minimum value of load current Io is 0, so at this time, it can be ensured that Δα/2π−ΔD>0. Because ΔD=kΔα/(2π), it can be converted that (1−k)Δα>0, so k is less than 1. It should be understood that k can be any constant less than 1, and of course k can also be a variable, as long as it is guaranteed that k is less than 1 at any time. For example, k can be a function related to duty ratio D, e.g., k=2D (in a case that D is less than 0.5) or k=½D+0.5, all of which can make k less than 1 at any time. Of course, the value range of k is selected on the premise of the full load range. In specific applications, if the minimum value of load current Io is greater than 0, then the value of k greater than 1 can make ΔQ greater than 0. Therefore, the value of k may be selected according to the particular load situation.

It can be seen from formula (4) that when D<0.5 and D>0.5, the expression of ΔQ consists of two parts, the first part of which increases with the increase of load current Io, and is independent of duty ratio D. Therefore, there is no technical problem that the voltage-sharing ability is weak when duty ratio D is close to 0 or 1. In addition, in the DCM mode, charge variation ΔQ can be deduced from FIG. 5 as shown in formula (5):

$$\Delta Q = \begin{cases} 2 \cdot s_1 \cdot DT_s \cdot \Delta DT_s, & D < 0.5 \\ 2 \cdot (s_1/s_2) \cdot s_1 \cdot (D - 0.5)T_s \cdot (\Delta \alpha/2\pi - \Delta D)T_s, & D > 0.5 \end{cases} \quad (5)$$

Similarly, formula (5) also needs to satisfy that ΔQ is greater than 0. It can be seen from formula (5) that when duty ratio D is less than 0.5, ΔQ is independent of k, so k only needs to be greater than 0; and when duty ratio D is greater than 0.5, it is necessary to ensure that Δα/2π−ΔD>0. As discussed above, in order to satisfy formula (5) in the full load range, then k can only be between 0 and 1. Therefore, after adopting the control method of the embodiment of the present invention, when duty ratio D is less than 0.5 in the DCM mode, charge variation ΔQ is greater than 0, and it has certain voltage-sharing ability, so this control method makes up for the shortcoming that the voltage-sharing ability of phase-shifting control is 0.

Figure 6:
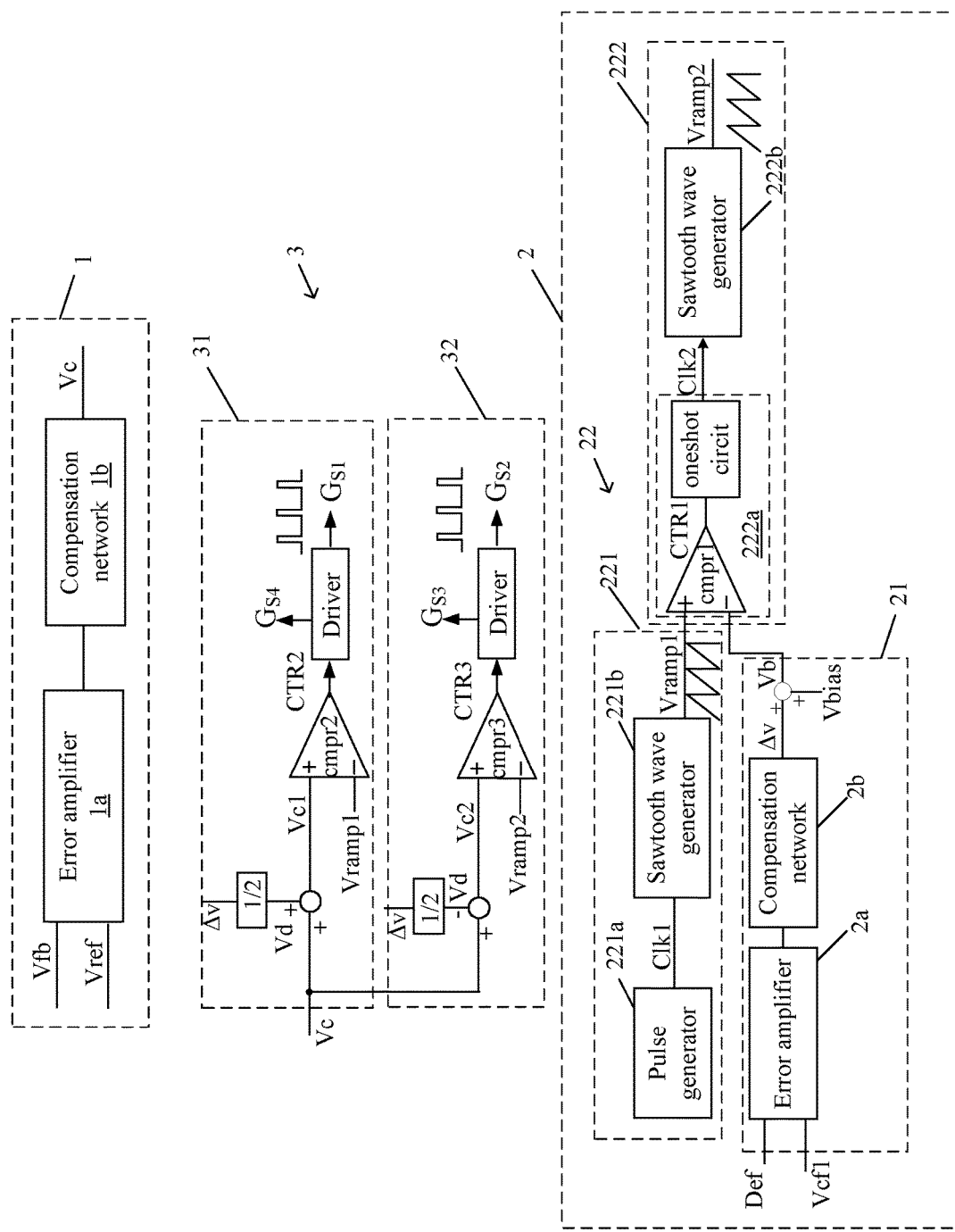
FIG. 6 is a schematic circuit diagram of an example control circuit of a three-level DC-DC converter, in accordance with embodiments of the present invention.

Referring now to FIG. 6, shown is a schematic circuit diagram of an example control circuit of a three-level DC-DC converter, in accordance with embodiments of the present invention. In this particular example, also using the three-level buck converter shown in FIG. 1, the control circuit can include feedback compensation circuit 1, capacitor balancing circuit 2, and driving circuit 3. Feedback compensation circuit 1 can generate feedback compensation signal Vc according to the error between feedback signal Vfb representing output voltage Vout and reference signal Vref representing the expected value of the output voltage. Capacitor balancing circuit 2 can adjust the phase difference between the power switches S1 and S2 according to the error between voltage $V_{cf}$ across flying capacitor Cf and the predetermined value.

For example, capacitor balancing circuit 2 can include capacitor compensation circuit 21 and sawtooth wave generation circuit 22. Capacitor compensation circuit 21 can generate capacitor compensation signal Δv according to the error between voltage $V_{cf}$ across flying capacitor Cf and the predetermined value, and may generate capacitor compensation signal Vb according to the sum of capacitor compensation signal Δv and bias voltage Vbias. Sawtooth wave generation circuit 22 may generate sawtooth wave signal Vramp1 for controlling power switches S1 and S4 according to the switching cycle, and sawtooth wave signal Vramp2 for controlling power switches S2 and S3 according to the switching cycle and second capacitor compensation signal Vb, where the cycles of sawtooth wave signals Vramp1 and Vramp2 are equal to the switching cycle, and the peak-to-peak values of sawtooth wave signals Vramp1 and Vramp2 are equal.

In this example, capacitor compensation signal Δv represents the variation of the phase difference between sawtooth wave signals Vramp1 and Vramp2. That is, capacitor compensation signal Δv represents variation Δα of the phase difference between power switches S1 and S2. In this example, bias voltage Vbias is equal to ½ of the peak-to-peak value of sawtooth wave signal Vramp1. Driving circuit 3 can generate driving signals for controlling power switches S1-S4 according to feedback compensation signal Vc and duty ratio adjustment signal Vd, where duty ratio adjustment signal Vd is used for adjusting the duty ratio of the power switches, and is proportional to capacitor compensation signal Δv; that is, Vd=kΔv.

For example, driving circuit 3 may generate compensation signal Vc1 according to the sum of feedback compensation signal Vc and duty ratio adjustment signal Vd, may generate compensation signal Vc2 according to the difference between feedback compensation signal Vc and duty ratio adjustment signal Vd, and then can compare compensation signal Vc1 against sawtooth wave signal Vramp1 to generate the driving signals for controlling power switches S1 and S4, and may compare compensation signal Vc2 against sawtooth wave signal Vramp2 to generate the driving signals for controlling power switches S2 and S3. The driving signals of power switches S1 and S4 can be complementary, the driving signals of power switches S2 and S3 may be complementary, and there can be phase difference α between the driving signals of power switches S1 and S2.

For example, feedback compensation circuit 1 can include error amplifier 1a for receiving feedback signal Vfb and reference signal Vref to generate an error signal, and compensation network 1b for compensating the error signal to generate feedback compensation signal Vc. Capacitor compensation circuit 21 can include a sampling circuit, error amplifier 2a, compensation network 2b, and a bias circuit. The sampling circuit can sample voltage $V_{cf}$ across flying capacitor Cf, and may generate capacitor voltage sampling signal Vcf1. Error amplifier 2a can obtain the error of capacitor voltage sampling signal Vcf1 and reference voltage Def representing the predetermined value (e.g., ½Vin). Compensation network 2b can compensate the error to obtain capacitor compensation signal Δv. The bias circuit can superimpose capacitor compensation signal Δv and bias voltage Vbias to obtain capacitor compensation signal Vb as the output signal of capacitor compensation circuit 21, where bias voltage Vbias is set such that the phase difference is π when capacitor compensation signal Δv is zero.

Sawtooth wave generation circuit 22 can include sawtooth wave generation circuits 221 and 222. Sawtooth wave generation circuit 221 can include pulse generator 221a and sawtooth wave generator 221b. Pulse generator 221a can generate clock signal Clk1 according to a set switching cycle, and sawtooth wave generator 221b can be controlled by clock signal Clk1 to generate sawtooth wave signal Vramp1, where the peak-to-peak value of sawtooth wave signal Vramp1 is Vpk, and the cycle of sawtooth wave signal Vramp1 is the same as the switching cycle.

Sawtooth wave generation circuit 222 can include clock signal generating circuit 222a and sawtooth wave generator 222b. Clock signal generating circuit 222a can generate clock signal Clk2 according to capacitor compensation signal Vb and clock signal Clk1, where capacitor compensation signal Vb can adjust the phase difference between clock signals Clk1 and Clk2. For example, clock signal generating circuit 222a can include comparator cmpr1 and a one-shot circuit. Comparator cmpr1 can compare capacitor compensation signal Vb against sawtooth wave signal Vramp1 to generate control signal CTR1. The one-shot circuit can generate clock signal Clk2 according to control signal CTR1, where the cycle of clock signal Clk2 is the same as that of clock signal Clk1, and the phase difference between them can be adjusted by capacitor compensation signal Vb. Sawtooth wave generator 222b can be controlled by clock signal Clk2 to generate sawtooth wave signal Vramp2, where the peak-to-peak value of sawtooth wave signal Vramp2 is Vpk, and the cycle of sawtooth wave signal Vramp2 is the same as the switching cycle; that is, sawtooth wave signals Vramp1 and Vramp2 may have the same cycle and amplitude, but different phases. The phase difference between sawtooth wave signals Vramp1 and Vramp2 can be adjusted according to capacitor compensation signal Vb.

Driving circuit 3 can include driving circuits 31 and 32. Driving circuit 31 can generate driving signals $G_{S1}$ and $G_{S4}$ for controlling power switches S1 and S4 according to the comparison result of compensation signal Vc1 and sawtooth wave signal Vramp1, where the sum of feedback compensation signal Vc and duty ratio adjustment signal Vd is compensation signal Vc1. Also, driving circuit 32 can generate driving signals $G_{S2}$ and $G_{S3}$ for controlling power switches S2 and S3 according to the comparison result of compensation signal Vc2 and sawtooth wave signal Vramp2, where the difference between feedback compensation signal Vc and duty ratio adjustment signal Vd is compensation signal Vc2. Duty ratio adjustment signal Vd can be proportional to capacitor compensation signal $\Delta v$; that is, $Vd=k\Delta v$, in this example, $k=\frac{1}{2}$.

In this example, the peak-to-peak values of sawtooth wave signals Vramp1 and Vramp2 may both be 1. According to the control principle, feedback compensation signal Vc can be equal to the duty ratio D before being adjusted using this approach, and capacitor compensation signal $\Delta v$ may represent variation $\Delta\alpha$ of the phase difference between power switches S1 and S2, where $\Delta v \times 2\pi = \Delta\alpha$, and according to the above analysis, $\Delta D$ should be equal to $k\Delta\alpha/(2\pi)$; that is, $\Delta D = k \times \Delta v \times 2\pi/(2\pi) = k\Delta v$. Thus, compensation signal Vc1 may be obtained by superimposing $k\Delta v$ on feedback compensation signal Vc, which can be equivalent to obtaining a new duty ratio $D1=D+\Delta D$, and compensation signal Vc2 can be obtained by subtracting $k\Delta v$ from feedback compensation signal Vc, which may be equivalent to obtaining a new duty ratio $D2=D-\Delta D$. Therefore, on the basis of adjusting the phase difference, voltage $V_{cf}$ of the flying capacitor may further be balanced by adjusting the duty ratio, such that voltage $V_{cf}$ can be balanced at the predetermined value (e.g., $\frac{1}{2}$Vin) in the full load range.

For example, driving circuit 31 can include comparator cmpr2, the non-inverting input terminal of which may receive compensation signal Vc1, and the inverting input terminal of which may receive sawtooth wave signal Vramp1. After comparison, logic driving signal CTR2 with a duty ratio of D1 can be generated at the output terminal of comparator cmpr2. Then, logic driving signal CTR2 can be amplified by a driver to generate driving signals $G_{S1}$ and $G_{S4}$. Driving circuit 32 can include comparator cmpr3, the non-inverting input terminal of which can receive compensation signal Vc2, and the inverting input terminal of which may receive sawtooth wave signal Vramp2. After comparison, logic driving signal CTR3 with a duty ratio of D2 can be generated at the output terminal of comparator cmpr3. Then, logic driving signal CTR3 can be amplified by a driver to generate driving signals $G_{S2}$ and $G_{S3}$.

If the peak-to-peak values of sawtooth wave signals Vramp1 and Vramp2 are not 1, but other values, this control approach may not be affected. At this time, compensation signal Vc1 may still be obtained by adding $k\Delta v$ to feedback compensation signal Vc, such that duty ratio $D1=D+\Delta D$, and compensation signal Vc2 may still be obtained by subtracting $k\Delta v$ from feedback compensation signal Vc, such that duty ratio $D2=D-\Delta D$.

When voltage $V_{cf}$ of the flying capacitor is less than the predetermined value (e.g., $\frac{1}{2}$Vin), the phase difference between driving signals $G_{S1}$ and $G_{S2}$ can increase by $\Delta\alpha$, duty ratio D1 may increase by $\Delta D$, and duty ratio D2 may decrease by $\Delta D$, such that the charging charge amount is greater than the discharging charge amount, and voltage $V_{cf}$ of the flying capacitor may gradually increase to near the predetermined value. When voltage $V_{cf}$ of the flying capacitor is larger than the predetermined value (e.g., $\frac{1}{2}$Vin), the phase difference between driving signals $G_{S1}$ and $G_{S2}$ may decrease by $\Delta\alpha$, duty ratio D1 can decrease by $\Delta D$, and duty ratio D2 may increase by $\Delta D$, such that the discharging charge amount is larger than the charging charge amount, and voltage $V_{cf}$ of the flying capacitor may gradually decrease to near the predetermined value.

Figure 7:
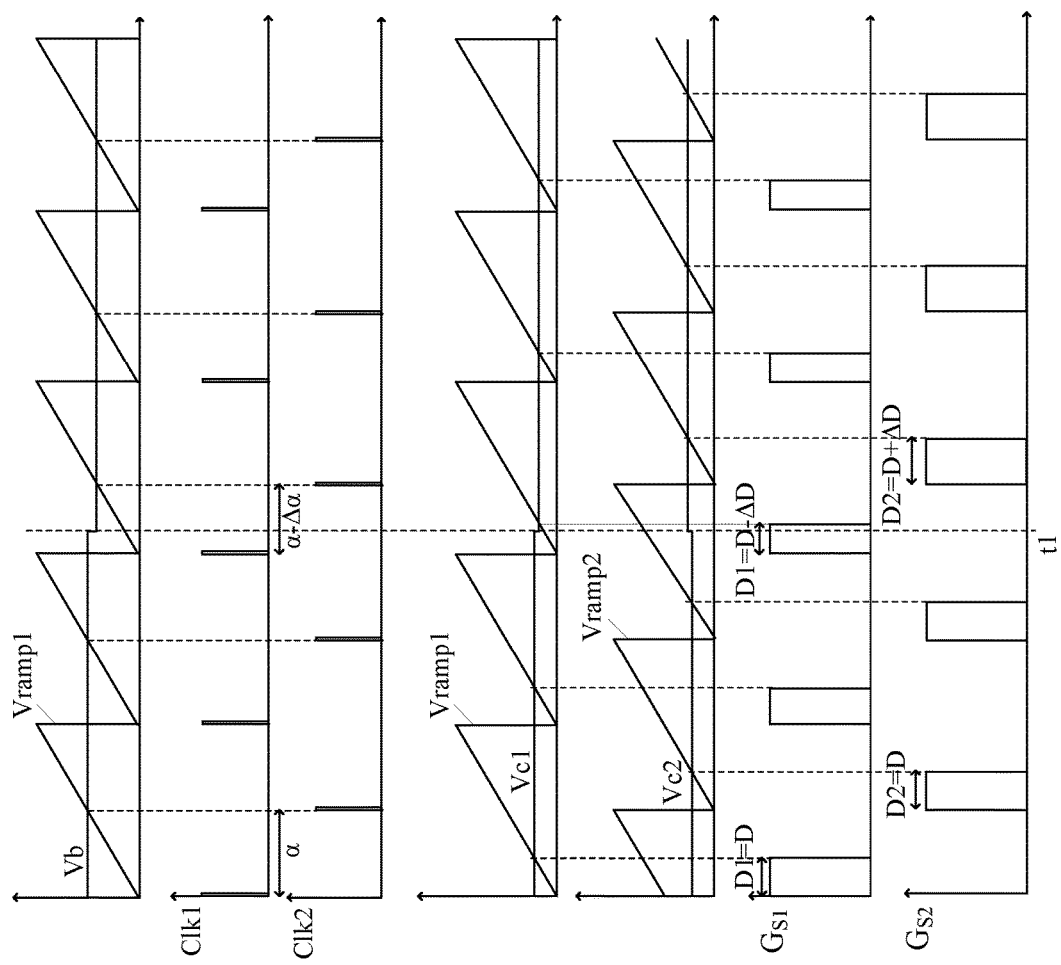
FIG. 7 is a waveform diagram of an example operation of a control circuit of a three-level DC-DC converter, in accordance with embodiments of the present invention.

Referring now to FIG. 7, shown is a waveform diagram of an example operation of a control circuit of a three-level DC-DC converter, in accordance with embodiments of the preset invention. For example, voltage $V_{cf}$ of the flying capacitor may be greater than the predetermined value. Before moment t1, the circuit is in the stable state, and voltage $V_{cf}$ of the flying capacitor is stable at $\frac{1}{2}$Vin. Therefore, capacitor compensation signal Vb can be equal to half of the peak-to-peak value of first sawtooth wave signal Vramp1, such that phase difference $\alpha$ between clock signals Clk2 and Clk1 is equal to R (i.e., $\alpha=n$). The error between feedback signal Vfb and reference signal Vref may pass through the compensation network to generate feedback compensation signal Vc, in order to control output voltage Vout as the expected value. Compensation signals Vc1 and Vc2 can respectively generated according to feedback compensation signal Vc, such that driving signal $G_{S1}$ is inactive when sawtooth wave signal Vramp1 rises to compensation signal Vc1, and driving signal $G_{S1}$ is active when clock signal Clk1 arrives. Also, driving signal $G_{S2}$ may be inactive when sawtooth wave signal Vramp2 rises to compensation signal Vc2, and driving signal $G_{S2}$ can be active when clock signal Clk2 arrives. For example, before moment t1, Vc1=Vc2=Vc, so D1=D2=D.

At moment t1, voltage $V_{cf}$ of the flying capacitor is greater than the predetermined value (e.g., $\frac{1}{2}$Vin), capacitor compensation signal $\Delta v$ can decrease, and capacitor compensation signal Vb may decrease, such that phase difference $\alpha$ decreases. After clock signals Clk1 and Clk2 are stabilized again, the phase difference is equal to $\alpha-\Delta\alpha$, and $\Delta\alpha$ is a positive value. Since compensation signal Vc1=Vc+$\Delta v$ and compensation signal Vc2=Vc-$\Delta v$, compensation signal Vc1 can decrease and compensation signal Vc2 may increase, such that the time for sawtooth wave signal Vramp1 to rise to compensation signal Vc1 becomes shorter; that is, duty ratio D1 can decrease, and duty ratio D1 may be equal to D-$\Delta D$ after stabilization. Also, the time for sawtooth wave signal Vramp2 to rise to compensation signal Vc2 may become longer; that is, duty ratio D2 can decrease, and duty ratio D2 may be equal to D+$\Delta D$ after stabilization.

As duty ratio D1 decreases and duty ratio D2 increases, charging period $T_c$ of the flying capacitor Cf can decrease and discharging period $T_d$ of the flying capacitor Cf may increase. At the same time, as the phase difference decreases, the freewheeling time of inductor L after the charging period can decrease, such that the average current value flowing through inductor L in the discharging period is larger than that in the charging period. That is, charging charge amount $Q_c$ of flying capacitor Cf in the charging period (i.e., the integral of inductor current IL to charging period $T_c$) is smaller than discharging charge amount $Q_d$ of flying capacitor Cf in the discharging period (i.e., the integral of inductor current IL to discharging period $T_d$). Therefore, the voltage of flying capacitor Cf may be reduced to the predetermined value.

Similarly, when the voltage of flying capacitor Cf is less than the predetermined value (e.g., ½Vin), capacitor compensation signal Δv can increase, and the phase difference between driving signals $G_{S1}$ and $G_{S2}$ may increase, duty ratio D1 can increase, and duty ratio D2 may decrease, such that the average current value flowing through inductor L in the discharging period is smaller than that in the charging period. That is, charging charge amount $Q_c$ of flying capacitor Cf in the charging period can be greater than discharging charge amount $Q_d$ of flying capacitor Cf in the discharging period. Therefore, the voltage of flying capacitor Cf can be increased to the predetermined value. Particular embodiments may also be applicable to the case where duty ratio D is not less than 0.5 (e.g., D>0.5).

In particular embodiments, by adjusting the phase difference between the first and second power switches in the three-level DC-DC converter, and the duty ratio of each power switch, the voltage of the flying capacitor can be stabilized at the predetermined value, where the variation of the duty ratio is proportional to the variation of the phase difference. The control scheme can also be effective under any load condition, which improves the efficiency and stability of the circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit of a three-level DC-DC converter, wherein:
   a) the three-level DC-DC converter comprises first, second, third, and fourth power switches coupled in series between an input voltage and a reference ground, and a flying capacitor coupled between a common node of the first and second power switches and a common node of the third and fourth power switches;
   b) the control circuit is configured to adjust a phase difference between driving signals of the first and second power switches, and duty ratios of the first and second power switches, according to an error between a voltage across the flying capacitor and a predetermined value, such that the voltage across the flying capacitor is stabilized at the predetermined value; and
   c) the duty ratio of the first power switch and the phase difference change in a same direction, and the duty ratio of the second power switch and the phase difference change in an opposite direction.

2. A control circuit of a three-level DC-DC converter, wherein:
   a) the three-level DC-DC converter comprises first, second, third, and fourth power switches coupled in series between an input voltage and a reference ground, and a flying capacitor coupled between a common node of the first and second power switches and a common node of the third and fourth power switches;
   b) the control circuit is configured to adjust a phase difference between driving signals of the first and second power switches, and duty ratios of the first and second power switches, according to an error between a voltage across the flying capacitor and a predetermined value, such that the voltage across the flying capacitor is stabilized at the predetermined value; and
   c) when the voltage across the flying capacitor is greater than the predetermined value, the control circuit is configured to control the phase difference to decrease, to control the duty ratio of the first power switch to decrease, and to control the duty ratio of the second power switch to increase.

3. The control circuit of claim 2, wherein when the voltage across the flying capacitor is less than the predetermined value, the control circuit is configured to control the phase difference to increase, to control the duty ratio of the first power switch to increase, and to control the duty ratio of the second power switch to decrease.

4. The control circuit of claim 1, wherein an absolute value of a variation of the duty ratio of the first power switch is equal to an absolute value of a variation of the duty ratio of the second power switch.

5. The control circuit of claim 1, wherein a variation of the duty ratio is proportional to a variation of the phase difference.

6. The control circuit of claim 4, wherein the variation of the duty ratio is equal to a product of a proportional coefficient and the variation of the phase difference, and wherein the proportional coefficient is configured as one of a constant and a function related to the duty ratio.

7. A control circuit of a three-level DC-DC converter, wherein:
   a) the three-level DC-DC converter comprises first, second, third, and fourth power switches coupled in series between an input voltage and a reference ground, and a flying capacitor coupled between a common node of the first and second power switches and a common node of the third and fourth power switches;
   b) the control circuit is configured to adjust a phase difference between driving signals of the first and second power switches, and duty ratios of the first and second power switches, according to an error between a voltage across the flying capacitor and a predetermined value, such that the voltage across the flying capacitor is stabilized at the predetermined value;
   c) the control circuit comprises a feedback compensation circuit configured to generate a feedback compensation signal according to an error between a feedback signal representing an output signal of the three-level DC-DC converter and a reference signal representing an expected value of the output signal;
   d) the control circuit comprises a capacitor balancing circuit configured to adjust the phase difference of the driving signals of the first and second power switches according to the error between the voltage across the flying capacitor and the predetermined value; and
   e) the control circuit comprises a driving circuit configured to generate driving signals for controlling first to fourth power switches in the three-level DC-DC converter according to the feedback compensation signal and a duty ratio adjustment signal, wherein the duty ratio adjustment signal is generated according to a variation of the phase difference.

8. The control circuit of claim 7, wherein the capacitor balancing circuit comprises:
   a) a capacitor compensation circuit configured to generate a first capacitor compensation signal according to the error between the voltage across the flying capacitor and the predetermined value, and to generate a second capacitor compensation signal according to a sum of the first capacitor compensation signal and a bias voltage;

b) a sawtooth wave generation circuit configured to generate a first sawtooth wave signal and a second sawtooth wave signal according to a switching cycle and the second capacitor compensation signal; and c) wherein cycles of the first and second sawtooth wave signals are equal to the switching cycle, and wherein peak-to-peak values of the first and second sawtooth wave signals are equal.

9. The control circuit of claim 8, wherein the first capacitor compensation signal is configured to characterize a variation of a phase difference between the first and second sawtooth wave signals.

10. The control circuit of claim 8, wherein the bias voltage is equal to ½ of the peak-to-peak value of the first sawtooth wave signal.

11. The control circuit of claim 8, wherein the capacitor compensation circuit comprises:

a) a sampling circuit configured to generate a capacitor voltage sampling signal representing the voltage across the flying capacitor;

b) an error amplifier configured to obtain an error between the capacitor voltage sampling signal and a reference voltage representing the predetermined value;

c) a compensation network configured to compensate the error to generate the first capacitor compensation signal; and d) a bias circuit configured to superpose the first capacitor compensation signal and the bias voltage to generate the second capacitor compensation signal.

12. The control circuit of claim 8, wherein the sawtooth wave generation circuit comprises:

a) a first sawtooth wave generation circuit configured to generate a first clock signal with a cycle equal to the switching cycle, and to generate the first sawtooth wave signal according to the first clock signal; and b) a second sawtooth wave generation circuit configured to generate a second clock signal by comparing the first sawtooth wave signal with the second capacitor compensation signal, and to generate the second sawtooth wave signal according to the second clock signal.

13. The control circuit of claim 12, wherein the second sawtooth wave generation circuit comprises:

a) a clock signal generating circuit configured to generate the second clock signal according to the second capacitor compensation signal and the first clock signal, wherein the second capacitor compensation signal is configured to adjust a phase difference between the first clock signal and the second clock signal; and b) a sawtooth wave generator configured to generate the second sawtooth wave signal according to the second clock signal, wherein a cycle of the second sawtooth wave signal is the same as a cycle of the second clock signal.

14. The control circuit of claim 8, wherein the driving circuit comprises:

a) a first driving circuit configured to generate a first driving signal according to a comparison result of a first compensation signal and the first sawtooth wave signal to control the first and fourth power switches;

b) a second driving circuit configured to generate a second driving signal according to a comparison result of a second compensation signal and the second sawtooth wave signal to control the second and third power switches;

c) wherein the first compensation signal is configured as a sum of the feedback compensation signal and the duty ratio adjustment signal; and d) wherein the second compensation signal is configured as a difference between the feedback compensation signal and the duty ratio adjustment signal.

15. The control circuit of claim 14, wherein the duty ratio adjustment signal is proportional to the first capacitor compensation signal.

16. The control circuit of claim 1, wherein the predetermined value is configured to ½ of the input voltage.

17. A power generating apparatus, comprising the control circuit and the three-level DC-DC converter of claim 1.

18. The power generating apparatus of claim 17, wherein when the three-level DC-DC converter operates in a continuous current mode, driving signals of the first and fourth power switches are complementary, driving signals of the second and third power switches are complementary, and there is a phase difference between driving signals of the first and second power switches.

19. The power generating apparatus of claim 17, wherein:

a) when the three-level DC-DC converter operates in a discontinuous current mode, the fourth power switch is turned on when the first power switch is turned off, and the fourth power switch is turned off when an inductor current reaches zero for a last time before the first switch is turned on again; and b) the third power switch is turned on when the second power switch is turned off, and the third power switch is turned off when the inductor current reaches zero for a last time before the second switch is turned on again, and there is a phase difference between driving signals of the first and second power switches.

* * * * *